United States Patent
Hawkins

(10) Patent No.: US 8,271,836 B2
(45) Date of Patent: Sep. 18, 2012

(54) CAPTURING DIAGNOSTICS IN WEB BROWSER APPLICATIONS

(75) Inventor: Jonathan C. Hawkins, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 532 days.

(21) Appl. No.: 11/862,460

(22) Filed: Sep. 27, 2007

(65) Prior Publication Data

US 2009/0089629 A1    Apr. 2, 2009

(51) Int. Cl.
*G06F 11/00* (2006.01)
(52) U.S. Cl. .................. 714/38.1; 709/224; 714/4.1
(58) Field of Classification Search .............. 709/224; 714/4, 38, 4.1, 38.1
See application file for complete search history.

(56) References Cited

U.S. PATENT DOCUMENTS

| | | | |
|---|---|---|---|
| 6,397,245 B1 | 5/2002 | Johnson, II et al. | |
| 6,434,615 B1 * | 8/2002 | Dinh et al. | 709/224 |
| 6,526,524 B1 * | 2/2003 | Kelley | 714/38 |
| 6,601,192 B1 * | 7/2003 | Bowman-Amuah | 714/38.12 |
| 6,636,983 B1 * | 10/2003 | Levi | 714/4 |
| 6,668,369 B1 * | 12/2003 | Krebs et al. | 717/125 |
| 6,708,137 B2 * | 3/2004 | Carley | 702/179 |
| 7,069,177 B2 * | 6/2006 | Carley | 702/179 |
| 7,216,007 B2 | 5/2007 | Johnson | |
| 7,325,045 B1 * | 1/2008 | Manber et al. | 709/219 |
| 7,343,625 B1 * | 3/2008 | Zaidi et al. | 726/25 |
| 7,392,510 B1 * | 6/2008 | Treder et al. | 717/128 |
| 7,523,191 B1 * | 4/2009 | Thomas et al. | 709/224 |
| 7,606,814 B2 * | 10/2009 | Deily et al. | 707/101 |
| 7,634,549 B1 * | 12/2009 | Ghaisas et al. | 709/220 |
| 7,720,764 B2 * | 5/2010 | Emerson et al. | 705/44 |
| 2001/0047375 A1 * | 11/2001 | Fest | 707/526 |
| 2002/0065689 A1 * | 5/2002 | Bingham et al. | 705/5 |
| 2002/0091784 A1 * | 7/2002 | Baker et al. | 709/208 |
| 2002/0120727 A1 * | 8/2002 | Curley et al. | 709/223 |
| 2003/0009555 A1 * | 1/2003 | Nickerson et al. | 709/224 |
| 2003/0046383 A1 * | 3/2003 | Lee et al. | 709/224 |
| 2004/0019688 A1 * | 1/2004 | Nickerson et al. | 709/229 |
| 2004/0054771 A1 | 3/2004 | Roe et al. | |
| 2004/0073654 A1 * | 4/2004 | Sarma | 709/224 |
| 2004/0088140 A1 * | 5/2004 | O'Konski et al. | 702/183 |
| 2004/0111394 A1 * | 6/2004 | Fish et al. | 707/3 |
| 2004/0215718 A1 * | 10/2004 | Kazmi et al. | 709/203 |
| 2005/0034029 A1 * | 2/2005 | Ramberg et al. | 714/43 |
| 2005/0050182 A1 | 3/2005 | Neville et al. | |
| 2005/0132337 A1 * | 6/2005 | Wedel et al. | 717/128 |
| 2005/0204034 A1 | 9/2005 | Betarbet | |
| 2005/0240798 A1 * | 10/2005 | Benedek et al. | 714/4 |

(Continued)

OTHER PUBLICATIONS

Keynote System, Press Room: 2006, http://www.keynote.com/company/press_room/releases_2006/11.07.06a.html.

(Continued)

*Primary Examiner* — Joshua P Lottich
(74) *Attorney, Agent, or Firm* — Workman Nydegger

(57) ABSTRACT

The present invention extends to methods, systems, and computer program products for capturing diagnostics for Web browser applications. Embodiments of the present invention can capture errors in client-side code for a Web application and automatically report them a Web Service. Diagnostics code can be automatically injected into client code to capture client-side diagnostic information, including but not limited to errors in Web application code (script code, managed code, etc) that runs in a Web browser. The client-side diagnostic information can be automatically forwarded to a Web service under the control of the Web application. The Web application operator can use this information to improve the quality and hence customer satisfaction of their Web application.

17 Claims, 2 Drawing Sheets

U.S. PATENT DOCUMENTS

| | | | |
|---|---|---|---|
| 2006/0059462 A1 | 3/2006 | Yamamoto | |
| 2006/0235947 A1* | 10/2006 | Gray et al. | 709/218 |
| 2006/0265260 A1* | 11/2006 | Brown et al. | 705/7 |
| 2007/0016672 A1 | 1/2007 | Wilson et al. | |
| 2007/0043532 A1 | 2/2007 | Wiedenberg et al. | |
| 2007/0073865 A1* | 3/2007 | Motoyama et al. | 709/224 |
| 2007/0118844 A1 | 5/2007 | Huang et al. | |
| 2007/0213966 A1* | 9/2007 | Noble | 703/13 |
| 2007/0234306 A1* | 10/2007 | Klinger et al. | 717/128 |
| 2007/0239701 A1* | 10/2007 | Blackman et al. | 707/5 |
| 2007/0260632 A1* | 11/2007 | Parsons et al. | 707/102 |
| 2007/0266148 A1* | 11/2007 | Ruiz et al. | 709/224 |
| 2007/0266150 A1* | 11/2007 | Lee et al. | 709/224 |
| 2008/0104224 A1* | 5/2008 | Litofsky et al. | 709/224 |
| 2008/0155340 A1* | 6/2008 | Tsun | 714/38 |
| 2008/0189406 A1* | 8/2008 | Shen | 709/224 |
| 2008/0222565 A1* | 9/2008 | Taylor et al. | 715/810 |
| 2008/0275951 A1* | 11/2008 | Hind et al. | 709/204 |
| 2008/0313504 A1* | 12/2008 | Wedel et al. | 714/45 |
| 2009/0271514 A1* | 10/2009 | Thomas et al. | 709/224 |

OTHER PUBLICATIONS

Mindreef Previews Web Services Diagnostics Technology, NuMega Founders Form New Company to Address Challenges of Isolating Problems in Distributed Applications, Boston, MA 2002 http://home.mindreef.com/index2.php?option=com_content&do_pdf=1&id=99.

IE HTTP Analyzer 2.2.2.115, SOFTPEDIA http://www.softpedia.com/get/Tweak/Browser-Tweak/IE-HTTP-Analyzer.shtml.

* cited by examiner

CAPTURING DIAGNOSTICS IN WEB BROWSER APPLICATIONS

CROSS-REFERENCE TO RELATED APPLICATIONS

N/A.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing components.

One common form of network based communication is exchanging electronic messages on the Worldwide Web ("WWW"). Content on the Worldwide Web is typically accessed in a client/server model. A "Web browser" of a client computer system sends a request to access content that is provided by a "Web Server" of a server computer system (e.g., by entering a Uniform Resource Locator ("URL") into the Web browser). If the user of the Web browser is authorized to access the content, the Web server typically provides the content to the Web browser. In a Web environment, content and requests for content, are frequently transported using Hypertext Transfer Protocol ("HTTP"). Web-based content can be provided in HyperText Markup Language ("HTML") pages, style sheets, images, scripts, etc. Thus, a Web server can return both static and dynamic content to a Web browser.

For example, scripts can be used to perform more complex operations than otherwise allowable using only HTML directives. Generally, scripts are executable code that can be executed at a Web server to add content to a page or can be sent down to a Web browser for execution at the Web browser to add content to a Web page. Scripts can be developed in a scripting (programming) language, such as, for example, JavaSript, VBScript, ASP, PHP, Perl, or ASP.Net. A web server can maintain pages that include both server-side and client-side scripts.

Server-side scripts can be used to obtain data accessible to a Web server for inclusion in a corresponding Web page or to perform other actions related to returning the corresponding Web page. When a Web server receives a Web browser request for a Web page that includes server-side script, the Web server passes the server-side script off to an appropriate script engine. The script engine processes the script to perform actions on relevant data and potentially returns portions of the relevant data, for example, represented in corresponding HTML directives. Any portions of relevant data, for example, the representative HTML directives, are then injected into a Web page for return to the Web browser (along with any client-side scripts).

Client-side scripts are useful for implementing additional behaviors to supplement Web browser functionality, such as, for example, to provide richer behavior and user interaction in the Web browser without any server interaction. Client-side scripts that request data or additional scripts from the Web server or from other Web servers are also possible. Client-side scripts can be embedded in a Web page or can be included in a separate file. When a client-side script is included in an external file, a Web page can include a script reference (e.g., <script type="text/javascript" src="hello.js"></script>) referencing the script or such a reference can be subsequently injected into the Web page. Client-side scripts and script references can be included in-line in a Web page that is sent to a Web browser. Thus, as the Web browser processes the Web page it can access and run embedded client-side scripts as well as external to client-side scripts.

Since scripts are executable code, there is some likelihood that during execution a script will operate in an inappropriate and/or unintended manner. Accordingly, some Web servers are configured to log information (e.g., missing resources, application code errors, etc.) related to inappropriate and/or unintended execution of server-side scripts. Web application developers and operators can then use information logged at the Web server to improve the application quality and end-user experience.

However, similar information is typically not logged for client-side scripts that operate in an inappropriate and/or unintended manner. When a client-side script operates in an inappropriate and/or unintended manner, the Web browser can be notified of the behavior. In response, the Web browser can notify an end user. For example, when a run-time error occurs in Web browser hosted code, the Web browser can present an error message to an end-user.

However, inappropriate and/or unintended operation of client-side scripts is typically not reported back to the Web server. Thus, any information related to the inappropriate and/or unintended operation of client-side scripts is essentially lost when the end-user clears any presented messages. Accordingly, it is difficult for a Web application developer or operator (that typically lacks physical access to an end-users computer system) to investigate the cause of the client-side script behavior and take any corrective action. In fact, the Web application developer or operator may not even become aware of the behavior until the end user initiates other communication (e.g., telephone call, electronic mail, etc.) to report the behavior.

BRIEF SUMMARY

The present invention extends to methods, systems, and computer program products for capturing diagnostics for web browser applications. A Web browser sends a Web page request to a Web server. The Web server receives the Web page request from the Web server. The Web server constructs a Web page to return to the Web browser in response to the Web page request. The Web page includes application code representing a portion of a Web based application. Execution of the application code at the Web browser is configured to generate a portion of content for presentation at the Web browser.

The Web server detects that diagnostics are enabled for Web based applications. The Web server injects diagnostic code into the constructed Web page in response to diagnostics being enabled. The diagnostic code is configured to capture diagnostic information related to the application code during execution of the application code. The Web server returns the constructed Web page to the Web browser.

The Web browser receives the Web page from the Web server. The Web browser executes the application code to generate the portion of content. The Web browser executes the diagnostic code. The executed diagnostic code captures diagnostic information related to the executed application code. The captured diagnostic information is retained for use in improving the quality of the Web based application.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
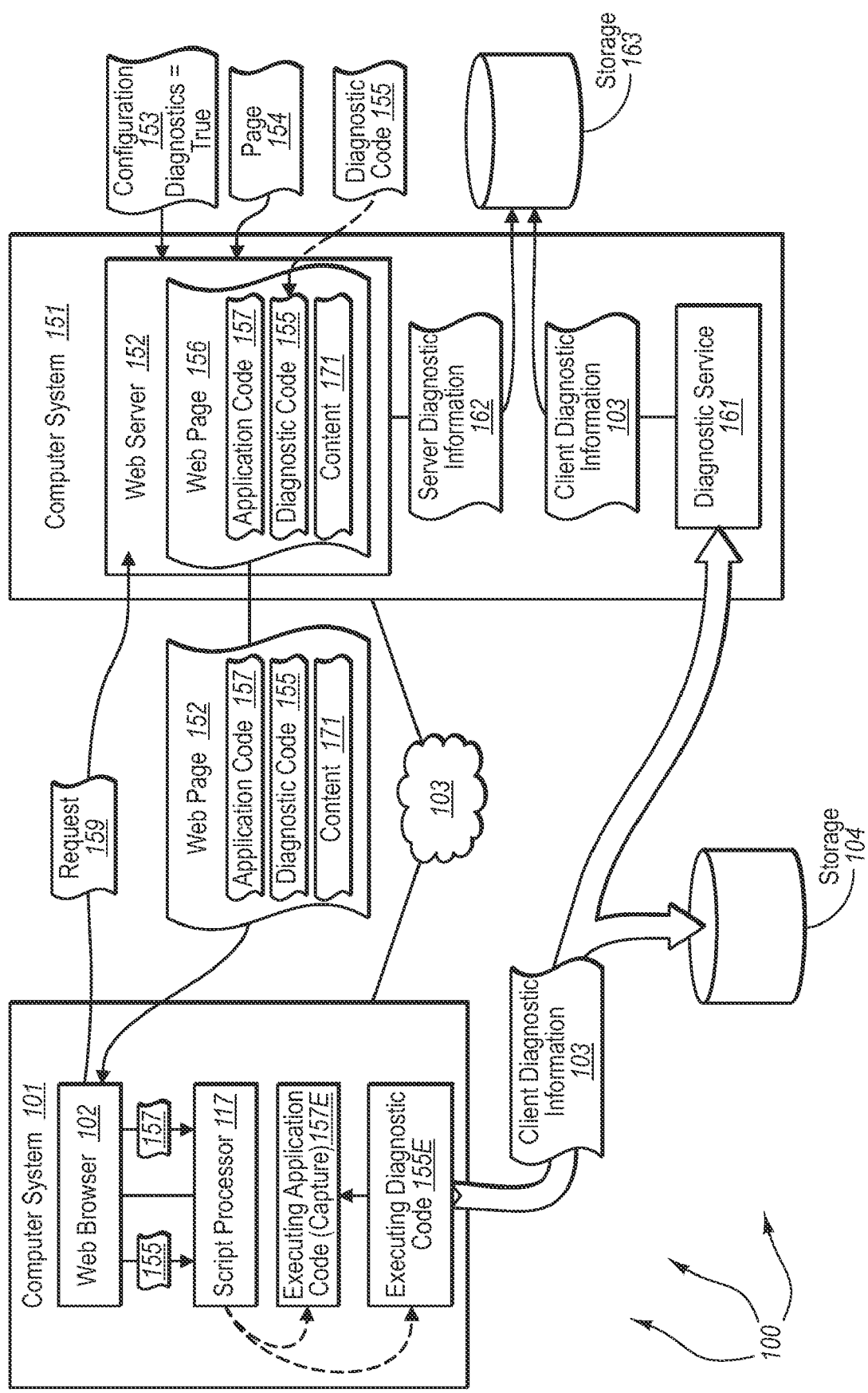
FIG. 1 depicts an example computer architecture that facilitates capturing diagnostics for Web browser applications

The present invention extends to methods, systems, and computer program products for capturing diagnostics for Web browser applications. A Web browser sends a Web page request to a Web server. The Web server receives the Web page request from the Web server. The Web server constructs a Web page to return to the Web browser in response to the Web page request. The Web page includes application code representing a portion of a Web based application. Execution of the application code at the Web browser is configured to generate a portion of content for presentation at the Web browser.

The Web server detects that diagnostics are enabled for Web based applications. The Web server injects diagnostic code into the constructed Web page in response to diagnostics being enabled. The diagnostic code is configured to capture diagnostic information related to the application code during execution of the application code. The Web server returns the constructed Web page to the Web browser.

The Web browser receives the Web page from the Web server. The Web browser executes the application code to generate the portion of content. The Web browser executes the diagnostic code. The executed diagnostic code captures diagnostic information related to the executed application code. The captured diagnostic information is retained for use in improving the quality of the Web based application.

Embodiments of the present invention may comprise or utilize a special purpose or general-purpose computer including computer hardware, as discussed in greater detail below.

Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

However, it should be understood, that upon reaching various computer system components program code means in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates capturing diagnostics for Web browser applications. Depicted in computer architecture 100 are computer system 101 and computer system 151. Computer system 101 includes Web browser 102 and Computer system 151 includes Web server 152 and diagnostic service 161. Each of the depicted components can be connected to one another over network 103, such as, for example, a Local Area Network ("LAN"), a Wide Area Network ("WAN"), and even the Internet. Accordingly, each of the depicted components as well as any other connected components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Web browser 101 can be configured to request Web-based content from Web servers, such as, for example, Web server 151, accessible via network 103. Web-based content can include text data, image data, audio/video data, executable code (e.g., scripts), etc. When executable code is received, such as, for example, a portion of Web-based application, the executable code can be executed by a script processor (e.g., script processor 117) accessible to Web browser 104.

Web server 152 is configured to receive Web browser requests, and return requested content back to a requesting Web browser. When Web server 106 receives a request, it can identify a server-side page (e.g., page 154) that corresponds to the request (e.g., through dispatching the request to an appropriate process based on a URL contained in the request). Web server 106 can then load the identified server-side page.

Server-side pages stored at computer system 151 can include server-side scripts that can be executed at Web server 152 to generate content for return to a Web browser. If any server-side script references are included in the server-side page, Web server 106 can send the referenced server-side scripts (e.g., ASP.Net instructions) to a server-side script processor (not shown) for processing. The server-side script processor processes the server-side scripts and returns any corresponding results back to Web browser 152. Web server 152 can then include the results, along with other (potentially static) content (e.g., collectively represented as content 171), and any client-side script references, in a Web page (e.g., Web page 152). Web server 106 can then return the Web page to the requesting Web browser.

Web server 152 can also collect server diagnostic information (e.g., server diagnostic information 162) for server-side scripts, including logging failures, such as, for example, missing resources, application code errors and other diagnostic information, such as, for example, stack traces, memory dumps, etc. Web server 152 can store server diagnostic information 162 at storage 163

Thus, for example, it may be that Web browser 102 sends requests 159 (an HTTP get) to Web server 152 (by utilizing an appropriate URL for Web server 152). Web server 152 can process request 159 and generate/obtain corresponding content. The corresponding content and any client-side script code and/or script references can be returned to Web browser 102 in Web page 152 (e.g., contained in an HTTP message). Client-side script references can reference scripts stored in various different locations at computer system 151, such as, for example, in a directory structure of a storage device, in an assembly (e.g., a dynamic link library ("DLL")), etc. Thus, script references can be utilized to access further client-side script code.

In computer architecture 100, application code 157 is used to collectively represent client-side script code that is either sent directly to Web browser 102 or subsequently access by Web browser 102 through a received client-side script reference.

Web server 152 can also refer to configuration 153 to determine if client diagnostics are turned on. When client diagnostics are turned on, Web server 152 can inject diagnostic code (e.g., further client-side script code and/or script references) into a Web page before returning the Web page to a requesting Web browser. Thus, diagnostic code (or references thereto) can be included in resources (e.g., client-side scripts including application code) that are subsequently downloaded. For example, when client diagnostics are turned on, Web server 152 can inject a diagnostics control into application code and then return a client-side script reference to the application code in a Webpage. When the Web browser subsequently uses the client-side script reference, application code including the diagnostics control is returned the Web browser.

Upon execution at the Web browser, the diagnostics control is utilized to capture client diagnostic information related to the application code. The client diagnostic information can be stored at storage 104 and/or sent to diagnostic service 161 (e.g., a Web service). Diagnostic service 161 can store client diagnostic information (along with corresponding server diagnostic information) at storage 163. The client diagnostic information can then be used along with the server diagnostic information to improving the quality of the Web based application.

Figure 2:
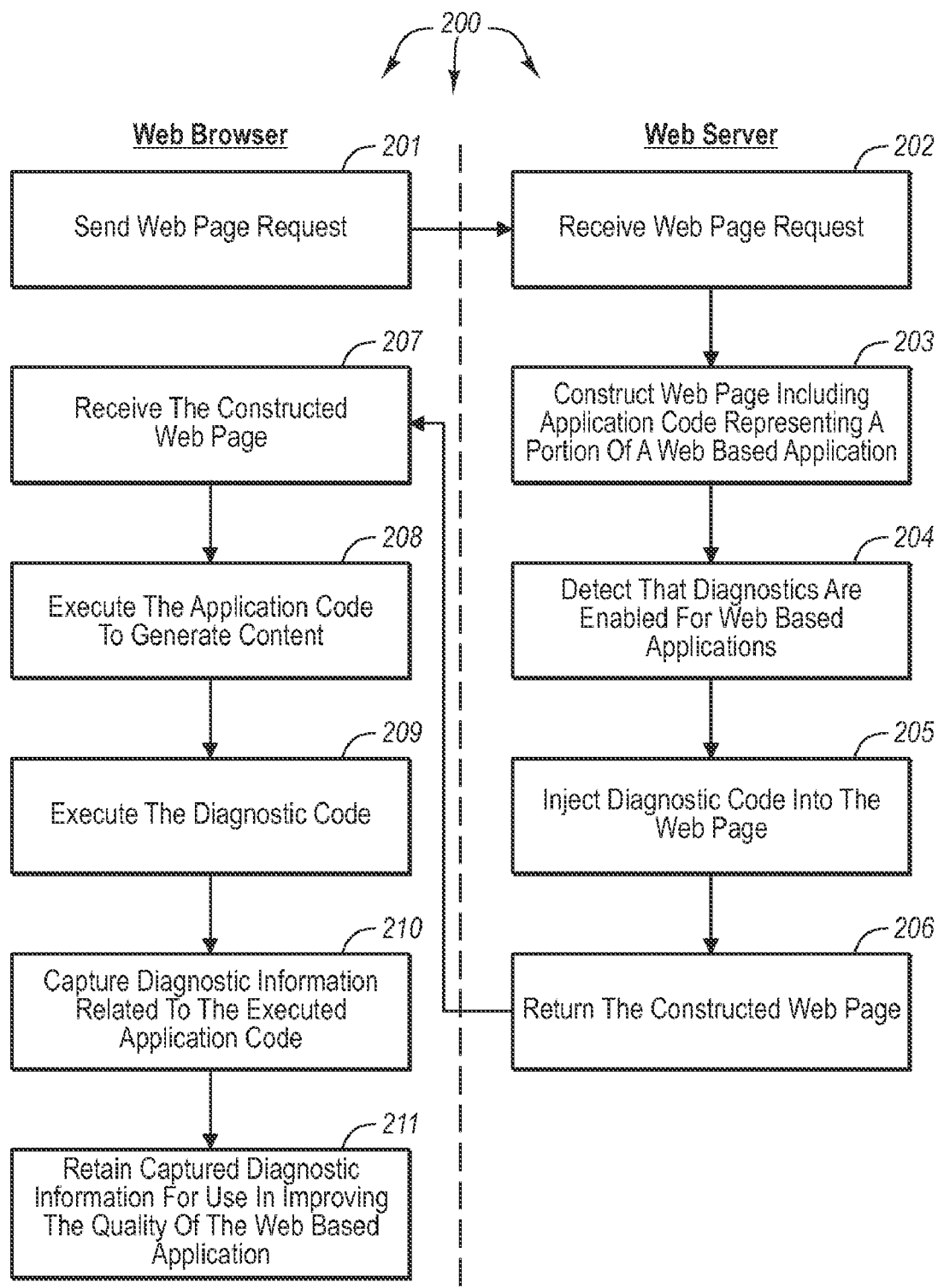
FIG. 2 illustrates a flow chart of an example method for capturing diagnostics for Web browser applications.

FIG. 2 illustrates a flow chart of an example method 200 for capturing diagnostics for Web browser applications. The method 200 will be described with respect to the components and data of computer architecture 100.

Method 200 includes an act of an act of sending a Web page request to a Web server (act 201). For example, Web browser 102 can send request 159 to Web server 152. Method 200 includes an act of receiving a Web page request from a Web server (act 202). For example, Web server 152 can receive request 159 from Web browser 102.

Method 200 includes an act of constructing a Web page to return to the Web browser in response to the Web page request, the Web page including application code representing a portion of a Web based application (act 203). For example, Web server 152 can construct Web page 156 for return to Web browser 102 in response to receiving request 159. As depicted, Web page 156 includes application code 157. Application code 157 is or refers to application code representing a portion of a Web based application. Application code 157 (or referenced application code), when executed, is configured to generate a portion of content for presentation at Web browser 102.

Application code can be written behind events, such as, for example, a "DiagnosticsService.OnClientException" event, to record an exception in a log or database. The following code example depicts an example of recording an exception to a log or database:

```
void Application_Start(object sender, EventArgs e)
{
    DiagnosticsService.OnClientException+= new ClientExceptionHandler(DiagnosticsService_OnClientException);
}
```

```
void DiagnosticsService_OnClientException(object o, ClientExceptionEventArgs e)
{
    //Log to heath monitoring or application database
}
```

Method 200 includes an act of detecting the diagnostics are enabled for Web based applications (act 204). For example, Web server 152 can refer configuration 153 to determine that "Client Diagnostics=TRUE". An administrator or other user can manual edit configuration 153 to enable or disable client diagnostics. For example, upon releasing a new version of a Web based application, client diagnostics can be enabled. Subsequently, when bugs and other inappropriate behaviors in the Web based application are corrected, diagnostics can be disabled. Configuration 153 can be web.config file including configuration data for Web server 156, such as, for example:

```
1.  <configSections>
2.      <sectionGroup name="web.preview" type="
            Web.Preview.Configuration.PreviewSectionGroup,
            Web.Preview">
3.          <Section name="diagnostics" type="
                Web.Preview.Configuration.DiagnosticsSection,
                Web.Preview"/>
4.      </sectionGroup>
5.  </configSections>
6.  <web.preview>
7.      ...
8.      <diagnostics enabled="true"/>
9.      ...
10. </.web.preview>
```

As depicted at line 8, client diagnostics are enabled. The value at line 8 can be changed to "false" to disable client diagnostics. Thus, upon receiving a Web page request Web server 152 can refer to line 8 to determine if client diagnostics are enabled or disabled. The use of a configuration file facilitates turning diagnostics on and off in a live production environment.

Method 200 includes an act of injecting diagnostic code into the constructed Web page in response to diagnostics being enabled, the diagnostic code configured to capture diagnostic information related to the application code during execution of the application code (act 205). For example, Web server 152 can automatically inject diagnostic code 155 into Web page 156 (as well as other resources that application code 157 is to download and utilize). Diagnostic code 155 is configured to capture diagnostic information (e.g., script errors, stack traces, and memory dumps, etc.) related to application code 157 during execution of application code 157. In some embodiments, a diagnostics controls, such as, for example:

<asp:DiagnosticsControl id="DiagnosticsControl1" runat="server"/> can be added to a Web page. The diagnostics control can be used to download diagnostics scripts and capture script errors. Application wide features, such as, for example, ASP.NET Masterpages, can be used to capture script errors across all those pages that share the master page.

Optionally Web server 152 can also include one or more portions of content, such as, for example, content 171, in Web page 156. Included content can be generated from execution of server-side scripts at Web server 152 and/or otherwise retrieved by Web server 152.

Method 200 includes an act of returning the constructed Web page to the Web browser (act 206). For example, Web server 152 can return Web page 156 to Web browser 102.

Method 200 includes an act of receiving a Web page from the Web server (act 207). For example, Web browser 102 can receive Web page 156 from Web server 152.

As depicted, Web page 156 includes application code 157 (or a reference thereto), diagnostic code 155 (or a reference thereto), and content 171. Application code 157 represents a portion of a Web based application. Execution of application code 157 is configured to generate a portion of content for presentation at Web browser 102. Diagnostic code 155 is configured to capture diagnostic information related to the application code 157 during execution of the application code 157.

Method 200 includes an act of the Web browser executing the application code to generate the portion of content (act 208). For example, Web browser 102 can pass application code 157 (or reference thereto) to script processor 117. Script processor 117 can execute application code 157 (potentially after downloading application code 157 and/or further resources from Web server 152) to generate a portion of content for presentation at Web browser 102. For example, script processor 117 can execute application code 157 resulting in executing application code 157E.

Method 200 includes an act of the Web browser executing the diagnostic code (act 209). For example, Web browser 102 can pass diagnostic code 155 (or reference thereto) to script processor 117. Script processor 117 can execute diagnostic code 155 (potentially after downloading application code 155 and/or further resources from Web server 152). For example, script processor 117 can execute diagnostic code 155 resulting in executing diagnostic code 155E.

Method 200 includes an act of the executed diagnostic code capturing diagnostic information related to the executed application code (act 210). For example, executing diagnostic code 155E can capture client diagnostic information 103 (e.g., script errors, stack traces, and memory dumps, etc.) related to executing application code 157E. Method 200 includes an act of retaining the captured diagnostic information for use in improving the quality of the Web based application (act 211). For example, executing diagnostic code 155E can store client diagnostic information 103 at storage 104 and/or forward client diagnostic information 103 to diagnostic service 161.

Diagnostic service 161 can be a Web service that is published along with the enablement of client diagnostics. The Web service can be added to a Web based application and a class set as appropriate. For example, the following code example depicts a Web service file called DiagnosticsService.asmx:

<%@ WebService Language="C#" Class="Web.Preview.Diagnostics.DiagnosticsService, Web.Preview" %>

As depicted, the code example sets "Class="Web.Preview.Diagnostics.DiagnosticsService, Web.Preview". A variety of different dynamic Web based languages, such as, for example, ASP.NET, can provide implementation for the class.

Executing diagnostic code 155E can record and forward client diagnostic information, such as, for example, client diagnostic information 103, to diagnostic service 161 using multiple extensible reporting mechanisms. The reporting mechanism can include, but are not limited to, send immediate, record and aggregate into memory and forward in batches, record in durable storage and forward at a later time, etc.

Diagnostic service 161 can store client diagnostic information at storage 163. Diagnostic service 161 can combine client diagnostic information 103 with server diagnostic information 162 to provide more complete diagnostic information for use in diagnosing inappropriate Web application behavior. For example, diagnostic service 161 can combine a client side script stack trace with a corresponding (i.e., for the same Web application) server side application stack trace when a failure occurs in server application code.

Diagnostic service 161 can also be configured to record diagnostics for multiple types of Web applications, such as, for example, AJAX and Rich Internet Applications.

In some embodiments, references to downloadable resources are included in a Web page in lieu of and/or along with (e.g., application or diagnostic) code. The references can refer to (e.g., the location of, such as, for example, in a URL) downloadable resources for execution of code. Thus, a Web page may include references to resources along with and/or instead of actual code. Accordingly, subsequent to receiving a Web page, Web browser 102 can use the references to download downloadable resources for executing code. As such, downloadable resources for application code 157 and/or diagnostic code 155 can be sent from Web server 152 to Web browser 102 in subsequent HTTP messages.

Accordingly, embodiments of the present invention can capture errors in client side code for a Web application and automatically report them a Web Service. Diagnostics code can be automatically injected into client code to capture client-side diagnostic information including but not limited to errors in Web application code (script code, managed code, etc) that runs in a Web browser. The client-side diagnostic information can be automatically forwarded to a Web service under the control of the Web application. The Web application operator can use this information to improve the quality and hence customer satisfaction of their web application.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a Web browser, a method for capturing diagnostics for a Web browser application executing on a client device, the method comprising:
    an act of sending a Web page request to a Web server;
    an act of receiving, at the client device, a Web page from the Web server, the Web page configured to present content at the Web browser on the client device, the received Web page including each of the following:
        content generated at least in part by a server-side script;
        a reference to application code representing a portion of a Web based application, execution of the application code configured to generate a portion of the content for presentation of the Web page at the Web browser on the client device;
        a client-side script reference wherein the client-side script reference is used to access additional client-side script code; and
        a reference to diagnostic code configured to capture client-side diagnostic information related to errors in the application code during execution of the application code of the same Web page in which the diagnostic code is referenced, wherein the Web page and diagnostic code corresponds to a master page which is used to capture script errors across all pages that share the master page;
    an act of the Web browser passing the application code to a script processor and the script processor executing the application code to generate the portion of content;
    an act of the Web browser executing the diagnostic code;
    an act of the executed diagnostic code capturing client-side diagnostic information related to errors in the executed application code; and
    an act of sending the captured client-side diagnostic information to a published Web service, the published Web service configured to:
        receive client-side diagnostic information related to execution of the application code at the Web browser on the client device; and
        combine client-side diagnostic information with any server-side diagnostic information related to the Web based application for use in improving the quality of the Web based application.

2. The method as recited in claim 1, further comprising subsequent to receiving the Web page:
    an act of using a reference for the application code to download resources from the Web server for executing the application code.

3. The method as recited in claim 1, further comprising subsequent to receiving the Web page:
    an act of using a reference for the diagnostic code to download resources from the Web server for executing the diagnostic code.

4. The method as recited in claim 1, wherein the reference to application code comprises the application code.

5. The method as recited in claim 1, wherein the reference to diagnostic code comprises the diagnostic code.

6. The method as recited in claim 1, wherein the at least a reference to diagnostic code comprises at least a reference to diagnostic code for capturing client-side diagnostic information related to one or more of script errors, stack traces, and memory dumps for portions of a Web application executed at the Web browser.

7. The method as recited in claim 1, further comprising an act of retaining the captured diagnostic information for use in improving the quality of the Web based application wherein retaining the captured client-side diagnostic information comprises using an extensible reporting mechanism selected from among:
    send immediate, record, and aggregate in memory;
    send in batches and record in durable storage; and
    forward at a later time.

8. At a computer system, a method for capturing diagnostics for a Web browser application, the method comprising:
    an act of receiving a Web page request from a Web browser, the Web browser being located at a client computing system;
    identifying a server-side page which corresponds to the Web page request, the server side page comprising a server-side script;
    executing the server-side script and generating content for return to the Web browser, wherein generating the content is done at least in part by executing the server-side script;
    an act of constructing a Web page to return to the Web browser in response to the Web page request, the constructed Web page including at least
    the content,
    a client-side script reference wherein the client-side script reference is used on the client to access additional client-side script code, and
    a reference to application code representing a portion of a Web based application, execution of the application code at the Web browser being configured to generate a portion of the content for presentation at the Web browser;

an act of detecting that diagnostics are enabled for Web based applications;

an act of injecting diagnostic code into the constructed Web page in response to diagnostics being enabled, the diagnostic code being included with the content and the reference to application code, and the diagnostic code being configured to capture client-side diagnostic information related to the application code during execution of the application code at the Web browser, wherein the Web page and diagnostic code corresponds to a master page which is used to capture script errors across all pages that share the master page; and an act of returning the constructed Web page to the Web browser of the client computing system;

an act of publishing a Web service configured to receive client-side diagnostic information related to execution of the application code at the Web browser;

an act of the Web service receiving captured client-side diagnostic information related to execution of the application code at the Web browser subsequent to sending the Web page to the Web browser, the client-side diagnostic information for use in improving the quality of the Web based application; and an act of combining the client-side diagnostic information with server-side diagnostic information related to the Web based application.

9. The method as recited in claim 8, wherein the act of constructing a Web page including at least a reference to application code representing a portion of a Web based application comprises an act of constructing a Web page that references downloadable resources for executing the application code.

10. The method as recited in claim 9, wherein the act of injecting diagnostic code into the constructed Web page in response to diagnostics being enabled comprises an act of injecting diagnostic code into the downloadable resources.

11. The method as recited in claim 10, further comprising subsequent to sending the Web page:

an act of receiving a request from the Web browser for the downloadable resources that include the injected diagnostic code; and an act of sending the downloadable resources to the Web browser.

12. The method as recited in claim 8, wherein the act of detecting the diagnostics are enabled for Web based applications comprises an act of referring to a Web configuration file.

13. The method as recited in claim 8, wherein the act of injecting diagnostic code into the constructed Web page comprises an act of injecting diagnostic code for capturing client-side diagnostic information related to one or more of script errors, stack traces, and memory dumps for portions of the Web based application executed at the Web browser.

14. A computer program product for use at a computer system, the computer program product of implementing a method for capturing diagnostics for a Web browser application, the computer program product comprising one or more physical storage devices having stored thereon computer-executable instructions that, when executed at a processor, cause a Web server at the computer system to perform the method, including the following:

receive a Web page request from a Web browser, the Web browser being located at a client computing system;

identify a server-side page which corresponds to the Web page request, the server side page comprising a server-side script;

execute the server-side script and generate content for return to the Web browser;

construct a Web page to return to the Web browser in response to the Web page request, the constructed Web page including at least the content generated at least in part by the server-side script, a client-side script reference which is used on the client to access additional client-side script code, and a reference to application code representing a portion of a Web based application, execution of the application code at the Web browser being configured to generate a portion of the content for presentation at the Web browser;

detect that diagnostics are enabled for Web based applications;

inject diagnostic code into the constructed Web page in response to diagnostics being enabled, the diagnostic code being included with the content and the reference to application code, and the diagnostic code being configured to capture diagnostic information related to the application code during execution of the application code; return the constructed Web page to the Web browser, wherein the Web page and diagnostic code corresponds to a master page which is used to capture script errors across all pages that share the master page;

return the constructed Web page to the Web browser of the client computing system;

publish a Web service configured to receive client-side diagnostic information related to execution of the application code at the Web browser;

receive, at the Web service, captured client-side diagnostic information related to execution of the application code at the Web browser subsequent to sending the Web page to the Web browser, the client-side diagnostic information for use in improving the quality of the Web based application; and combine the client-side diagnostic information with server-side diagnostic information related to the Web based application.

15. The computer program product as recited in claim 14, wherein computer-executable instructions that, when executed, cause the Web server to construct a Web page including at least a reference to application code representing a portion of a Web based application comprise computer-executable instructions that, when executed, cause the Web server to construct a Web page that references downloadable resources for executing the application code.

16. The computer program product as recited in claim 15, wherein computer-executable instructions that, when executed, cause the Web server to inject diagnostic code into the constructed Web page in response to diagnostics being enabled comprise computer-executable instructions that, when executed, cause the Web server to inject diagnostic code into the downloadable resources.

17. The computer program product as recited in claim 14, further comprising computer-executable instructions that, when executed, cause the Web server to:

receive a request from the Web browser for downloadable resources that include the injected diagnostic code; and send the downloadable resources to the Web browser.

* * * * *